Jan. 18, 1944.    W. RUTTEN    2,339,355
APPARATUS FOR EDGING AND FORMING
Filed May 10, 1940    15 Sheets-Sheet 2
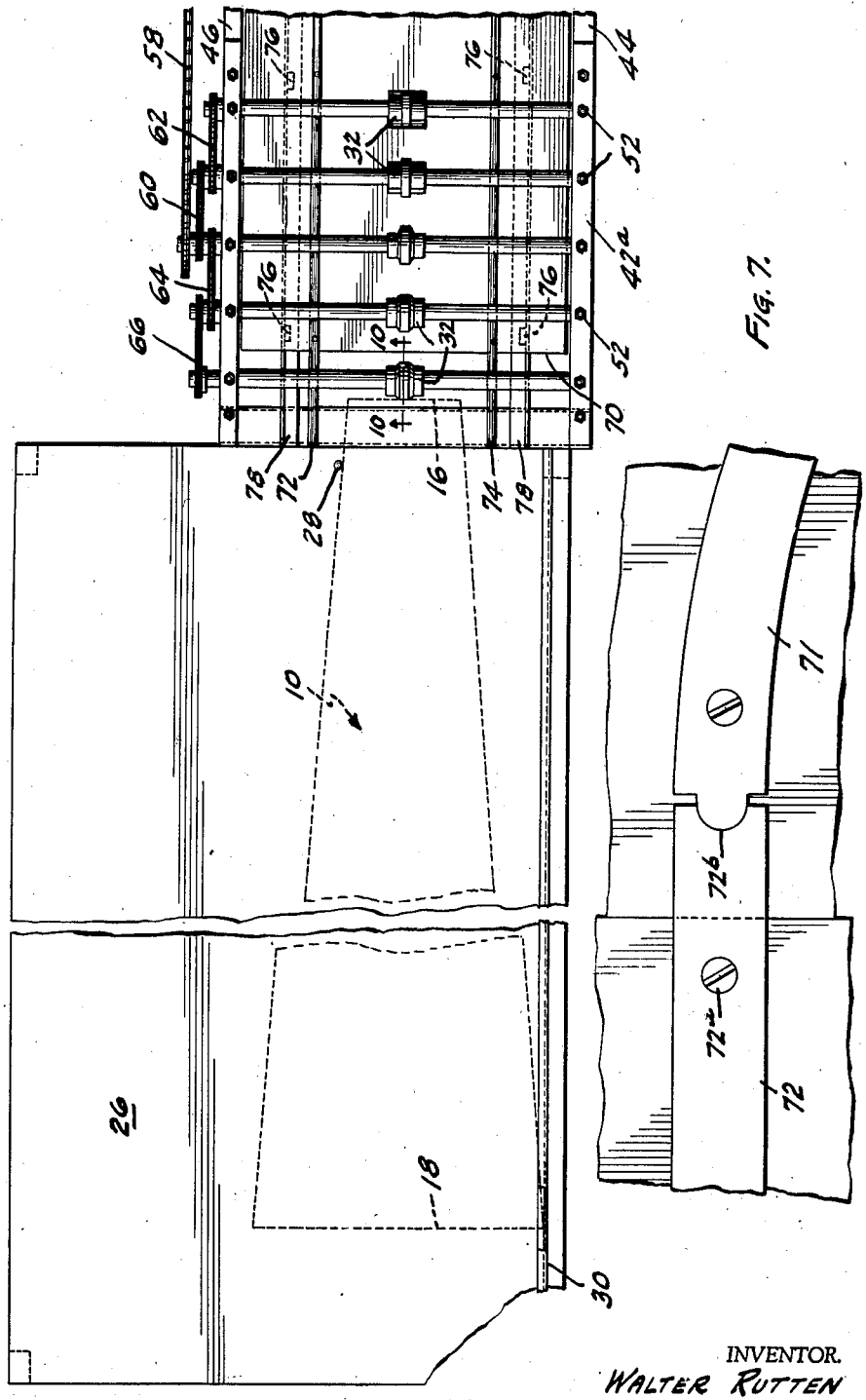
INVENTOR.
WALTER RUTTEN
BY Harry H. Hitzeman
ATTORNEY.

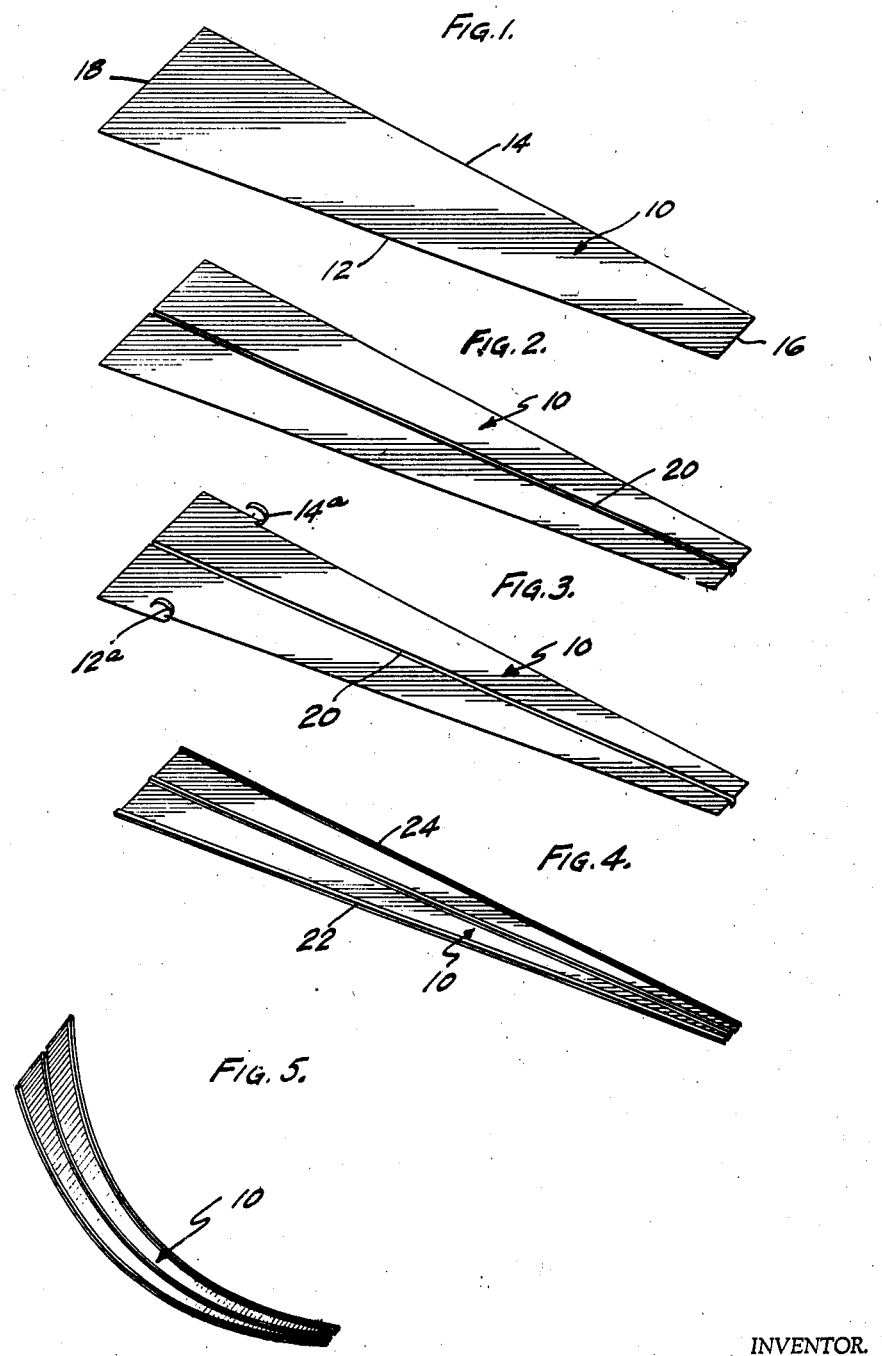

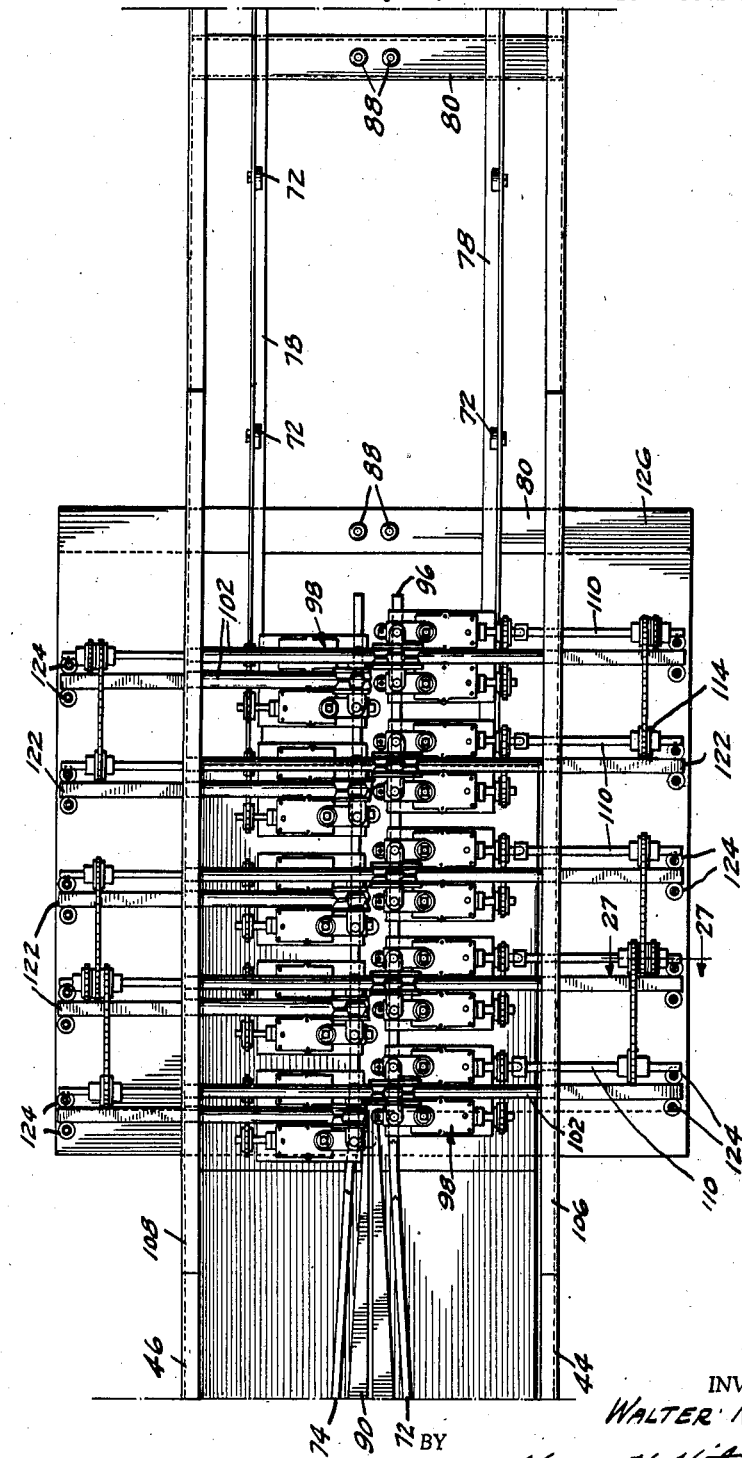

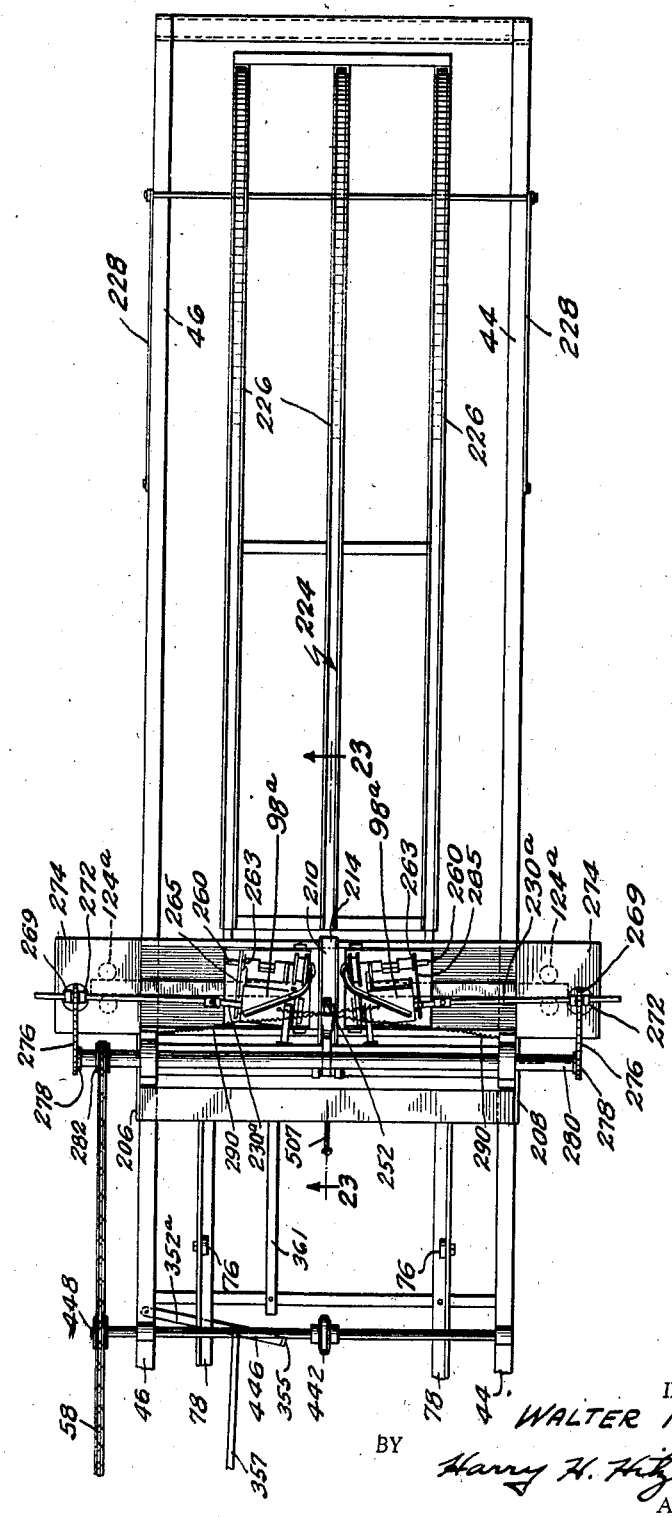

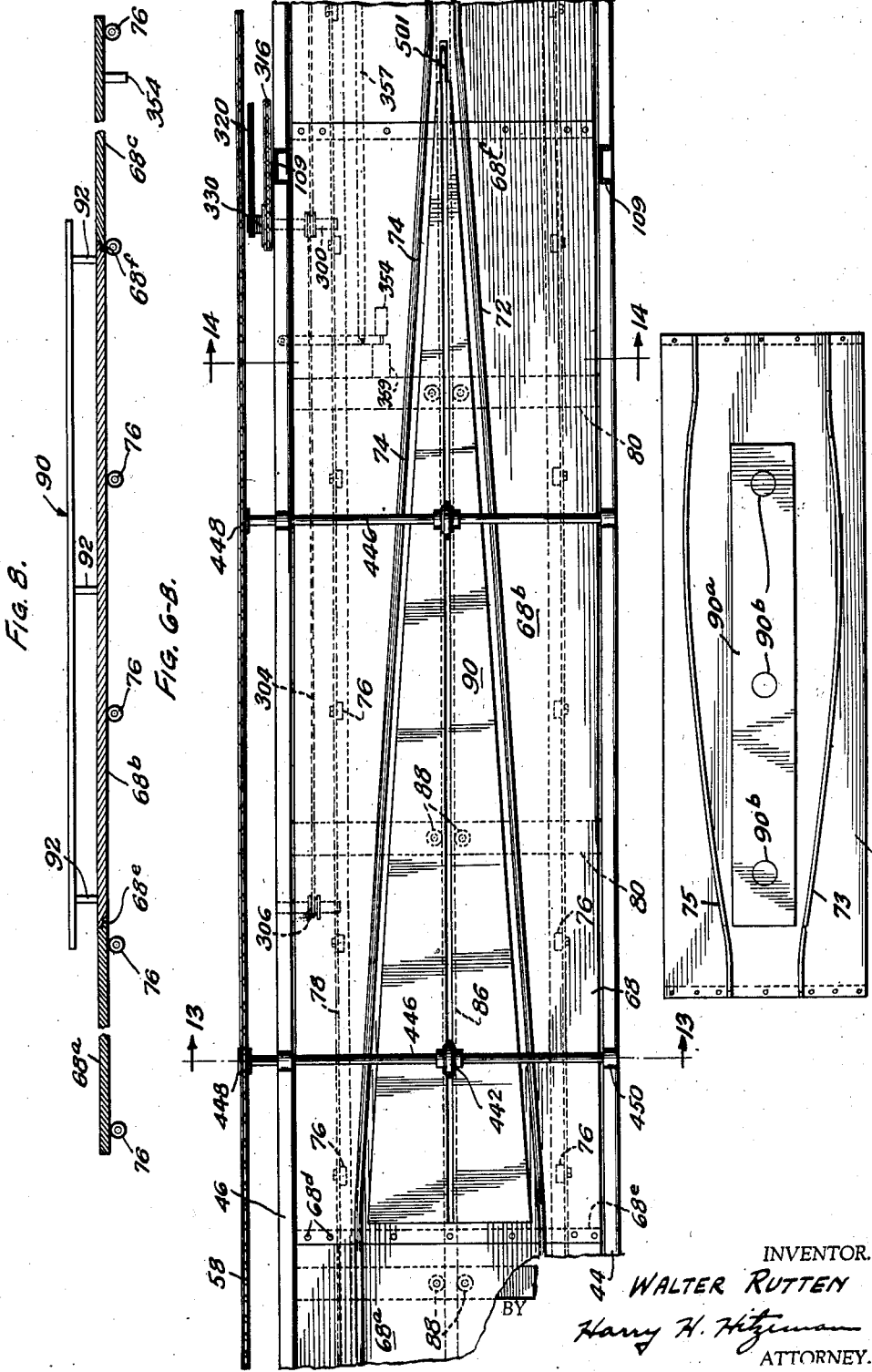

Jan. 18, 1944. W. RUTTEN 2,339,355
APPARATUS FOR EDGING AND FORMING
Filed May 10, 1940 15 Sheets-Sheet 6
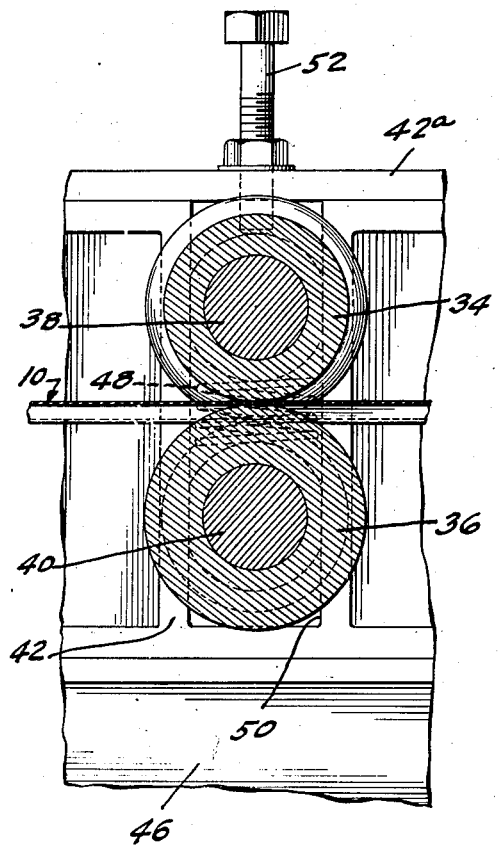
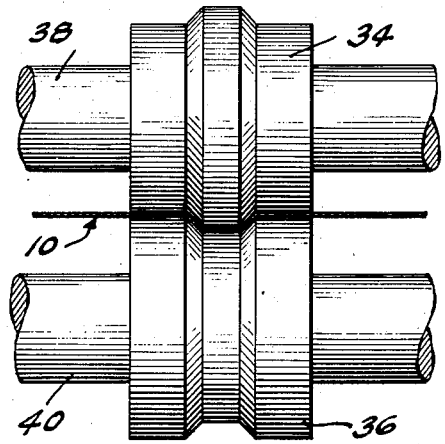
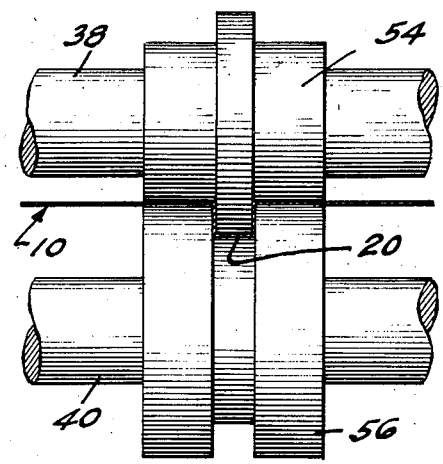
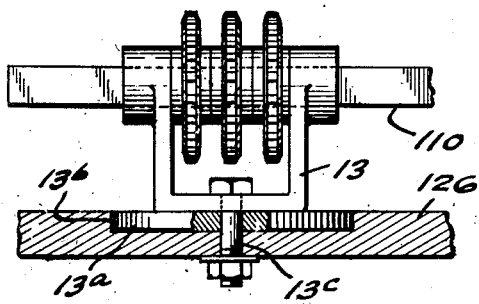
INVENTOR.
WALTER RUTTEN
BY Harry H. Hitzeman
ATTORNEY.

Jan. 18, 1944.  W. RUTTEN  2,339,355
APPARATUS FOR EDGING AND FORMING
Filed May 10, 1940  15 Sheets-Sheet 7

INVENTOR.
WALTER RUTTEN
BY Harry H. Hitzeman
ATTORNEY.

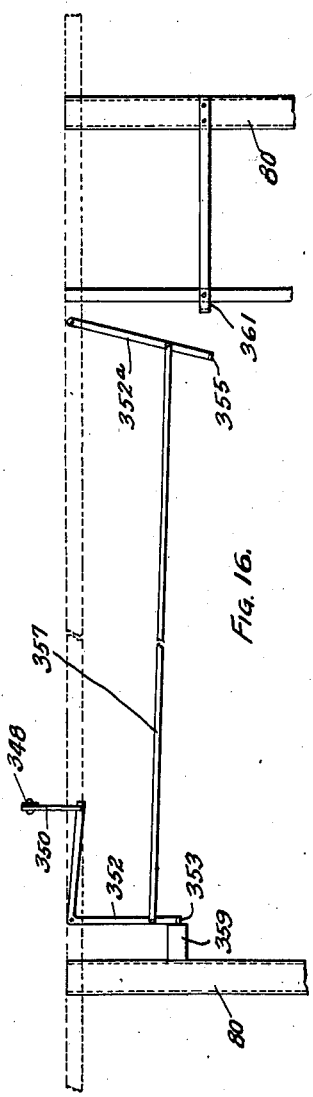
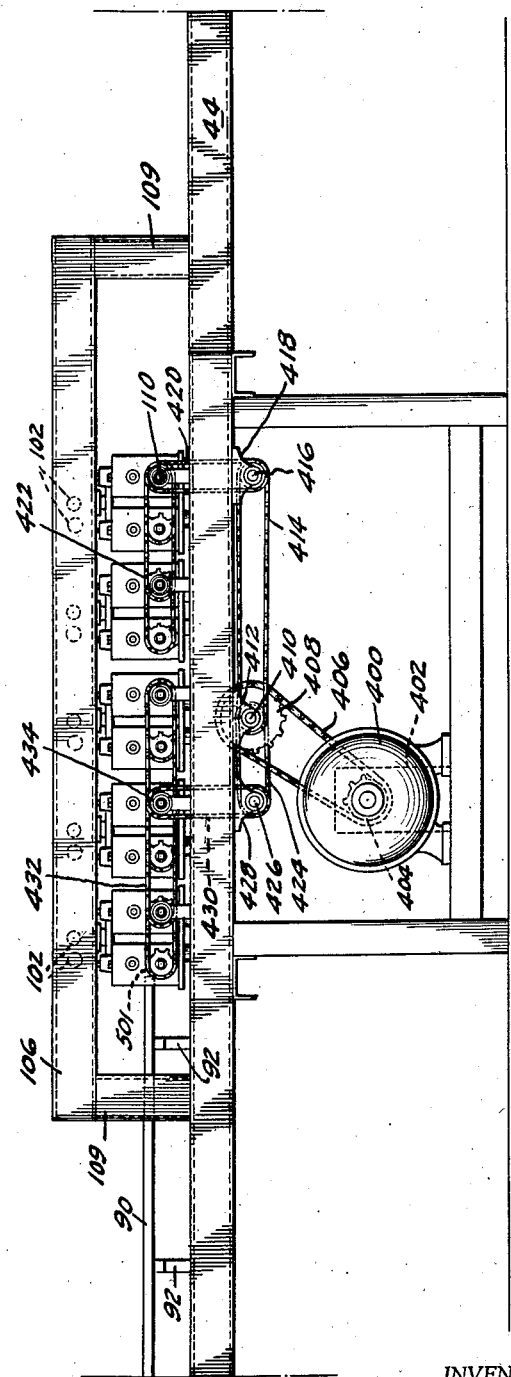

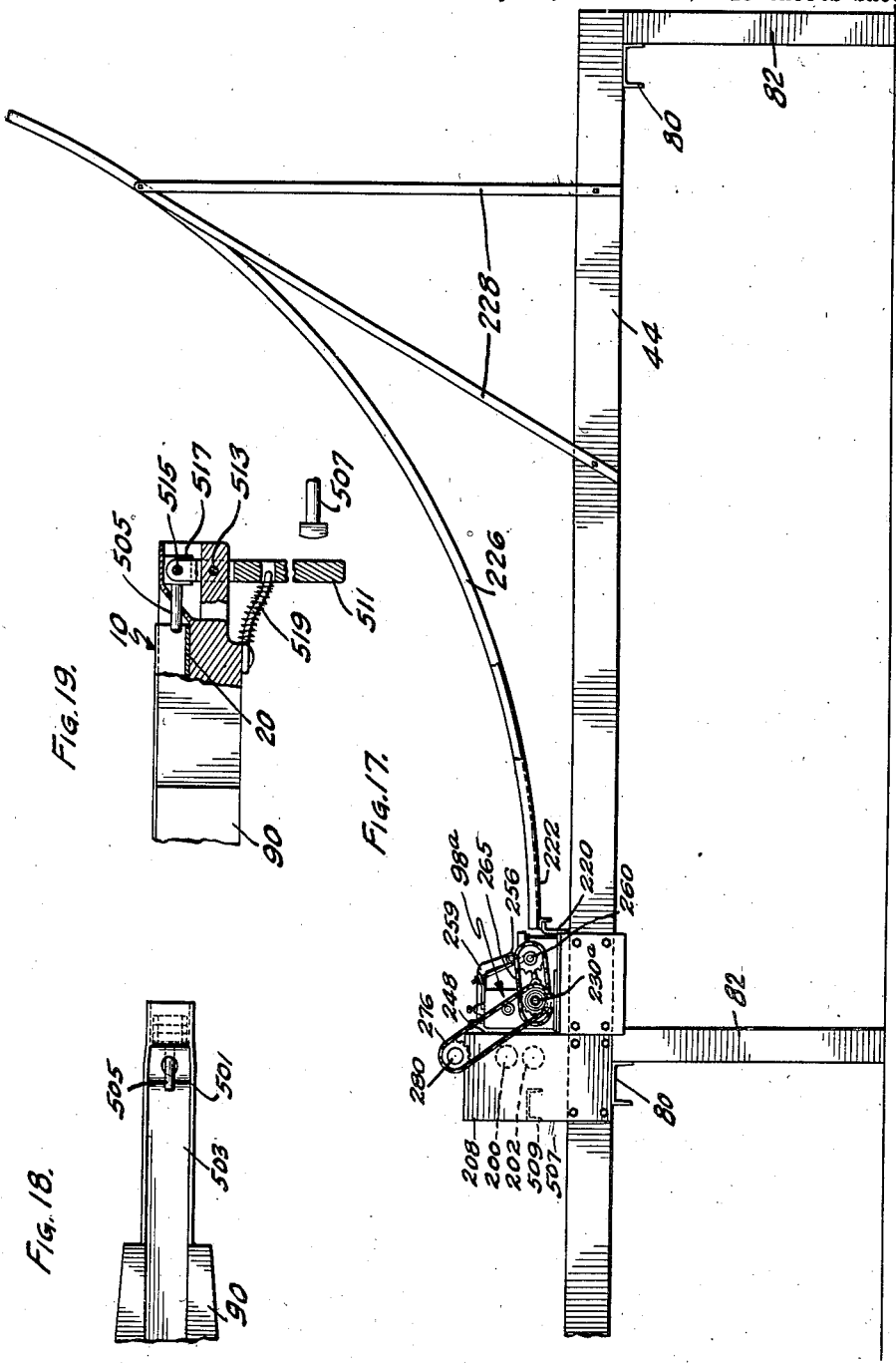

Jan. 18, 1944.   W. RUTTEN   2,339,355
APPARATUS FOR EDGING AND FORMING
Filed May 10, 1940   15 Sheets-Sheet 10

INVENTOR.
WALTER RUTTEN
BY
Harry H. Hitzeman
ATTORNEY.

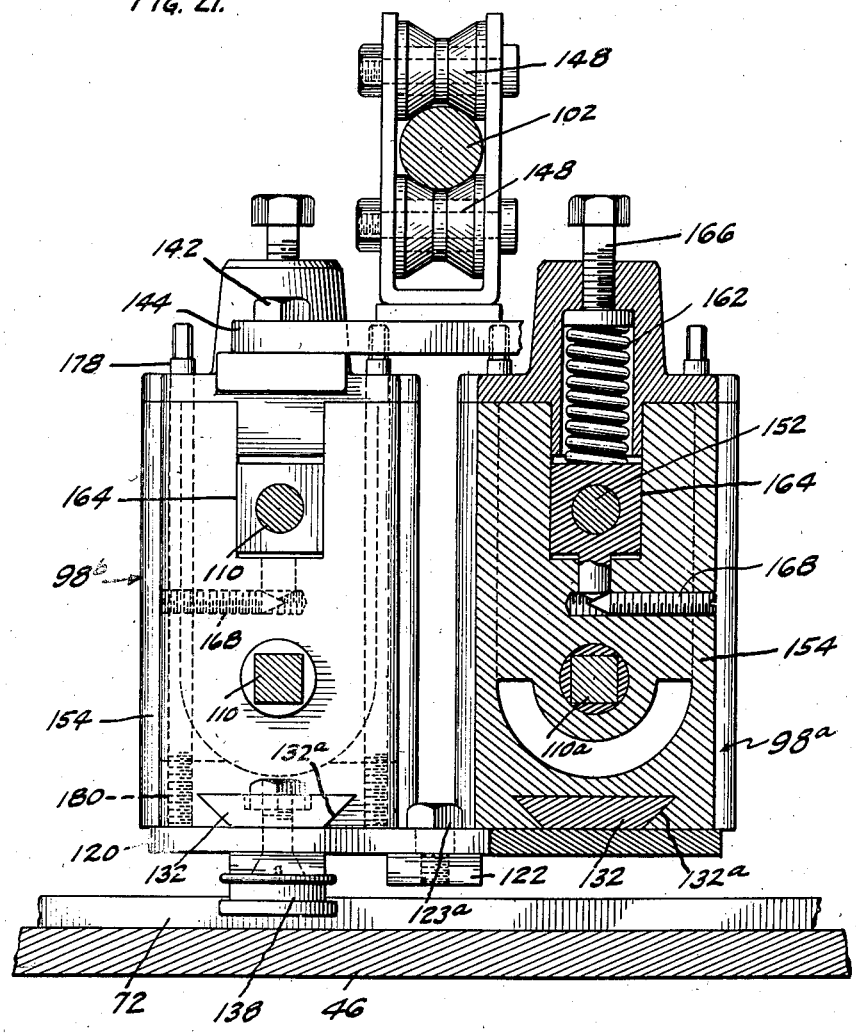

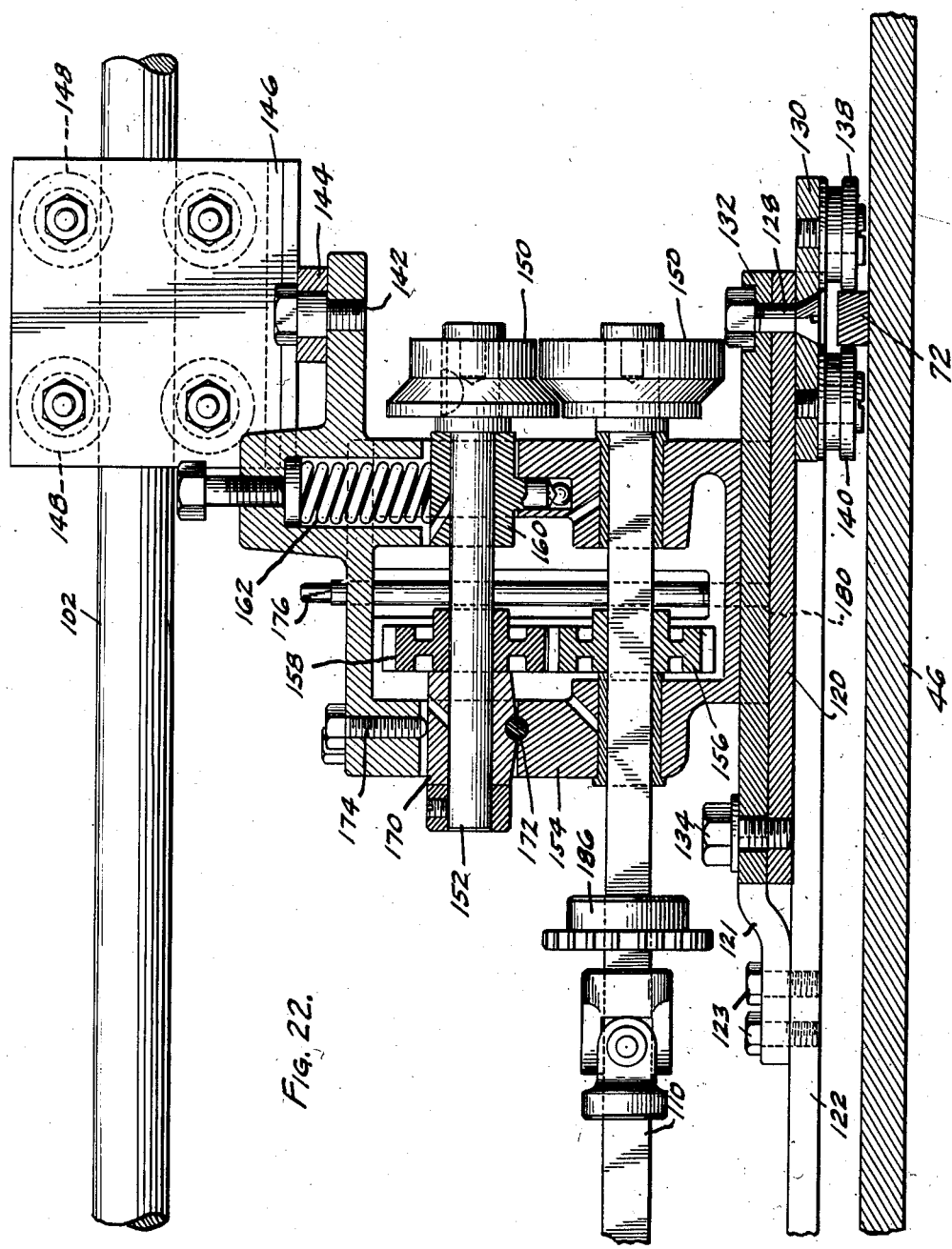

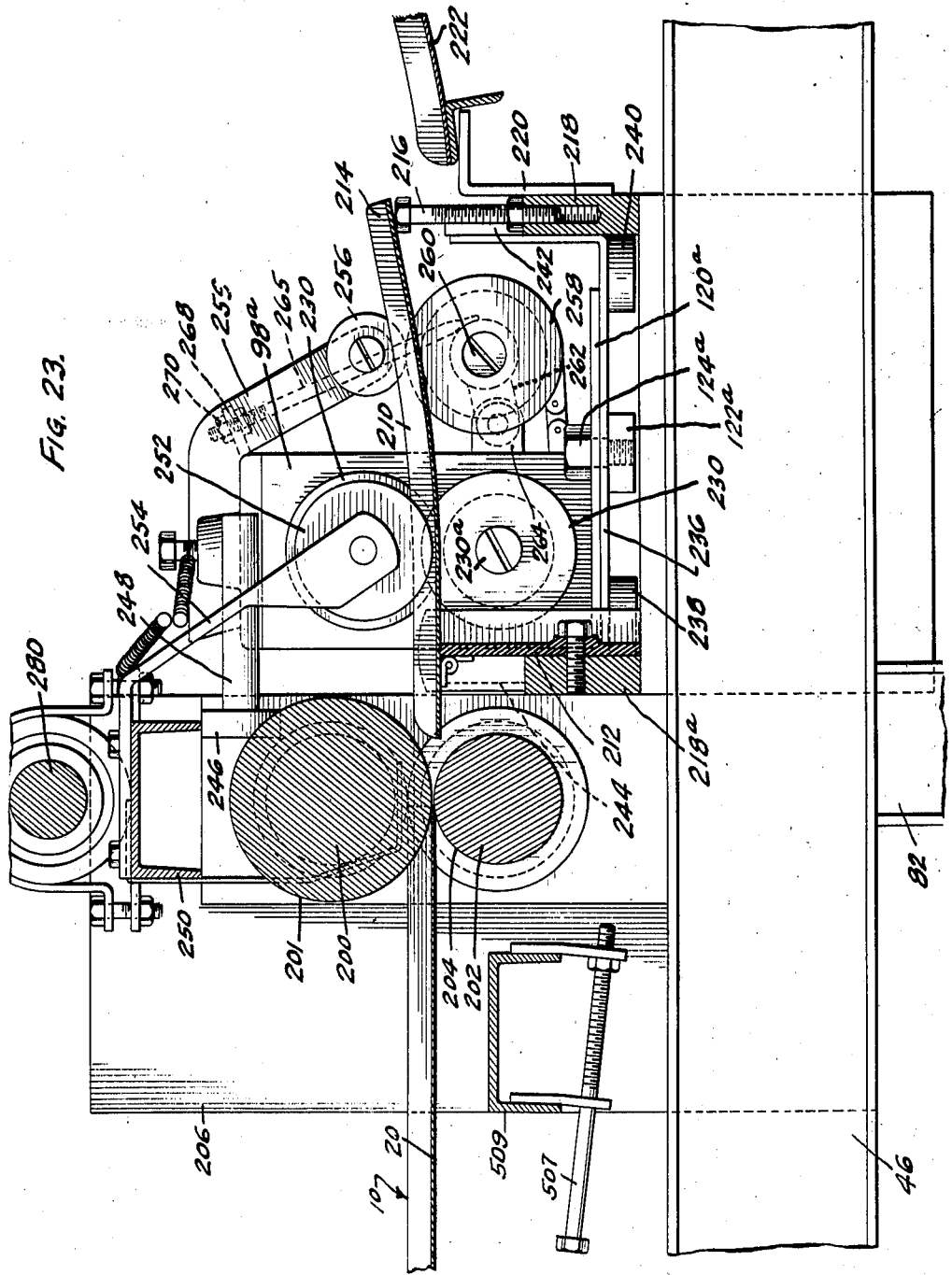

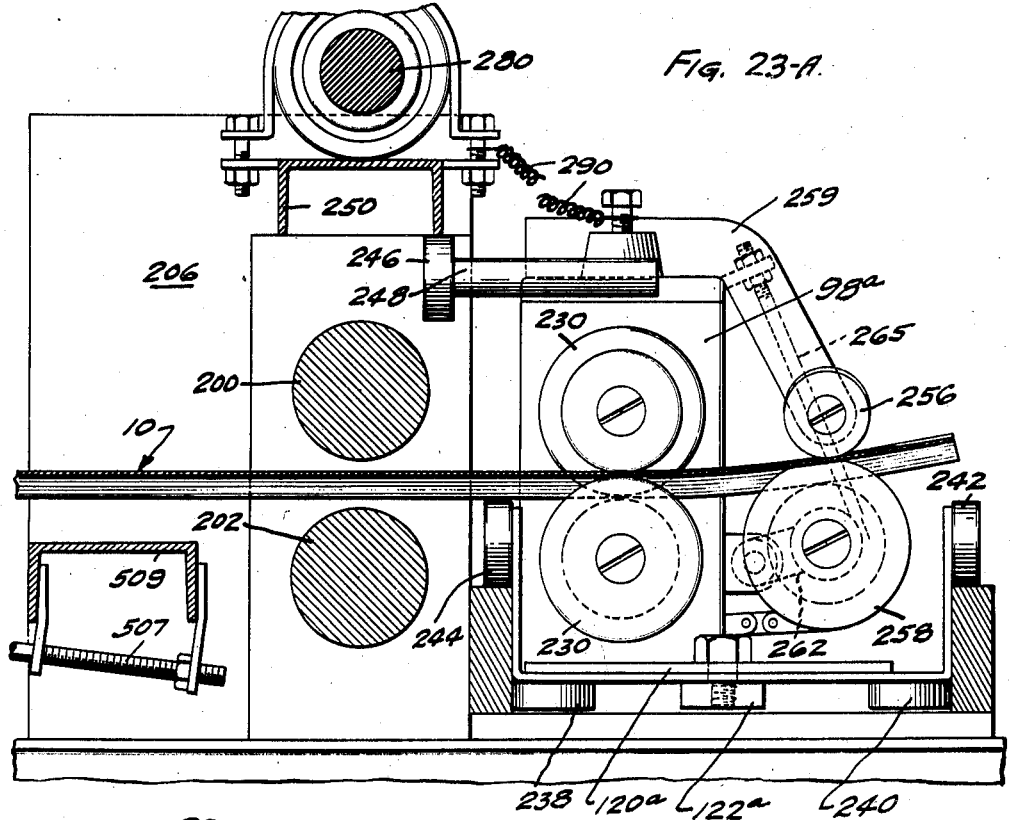
Fig. 23-A.
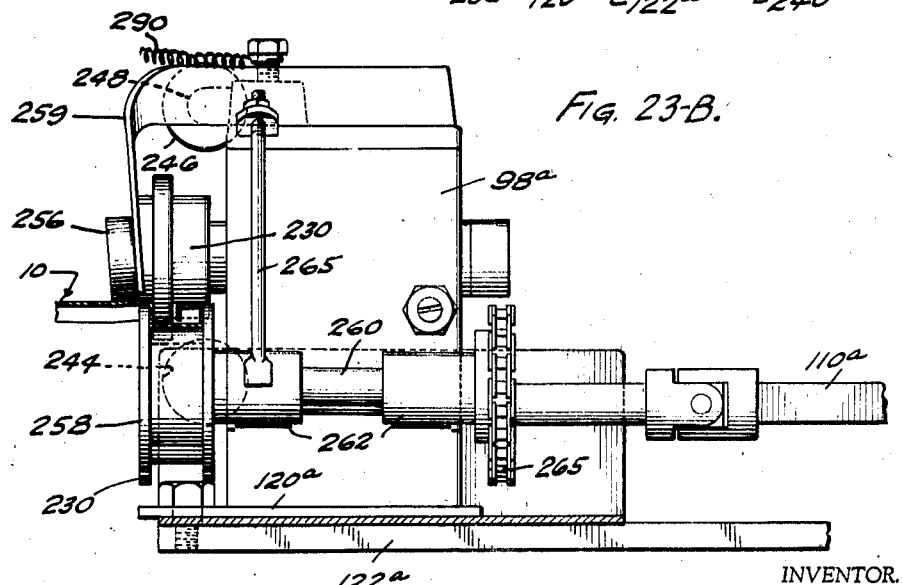
Fig. 23-B.

Jan. 18, 1944.　　　　W. RUTTEN　　　　2,339,355
APPARATUS FOR EDGING AND FORMING
Filed May 10, 1940　　　15 Sheets-Sheet 15
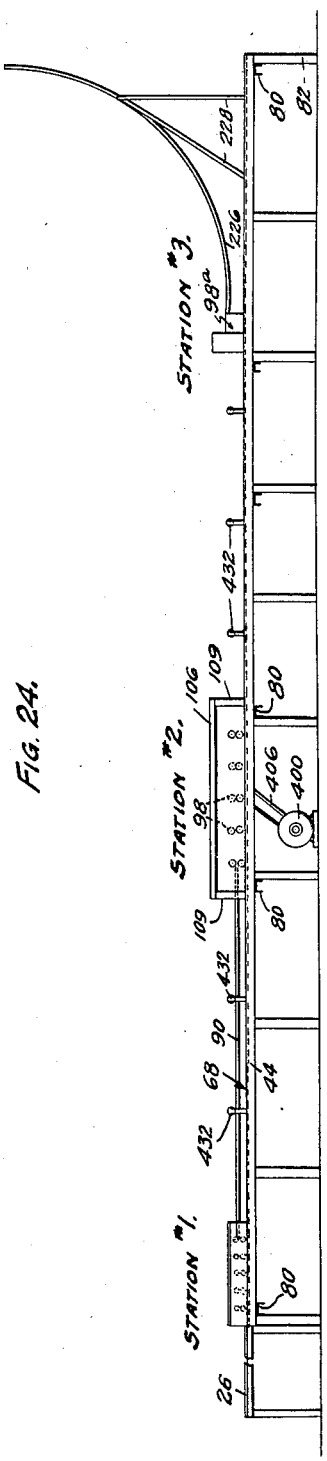
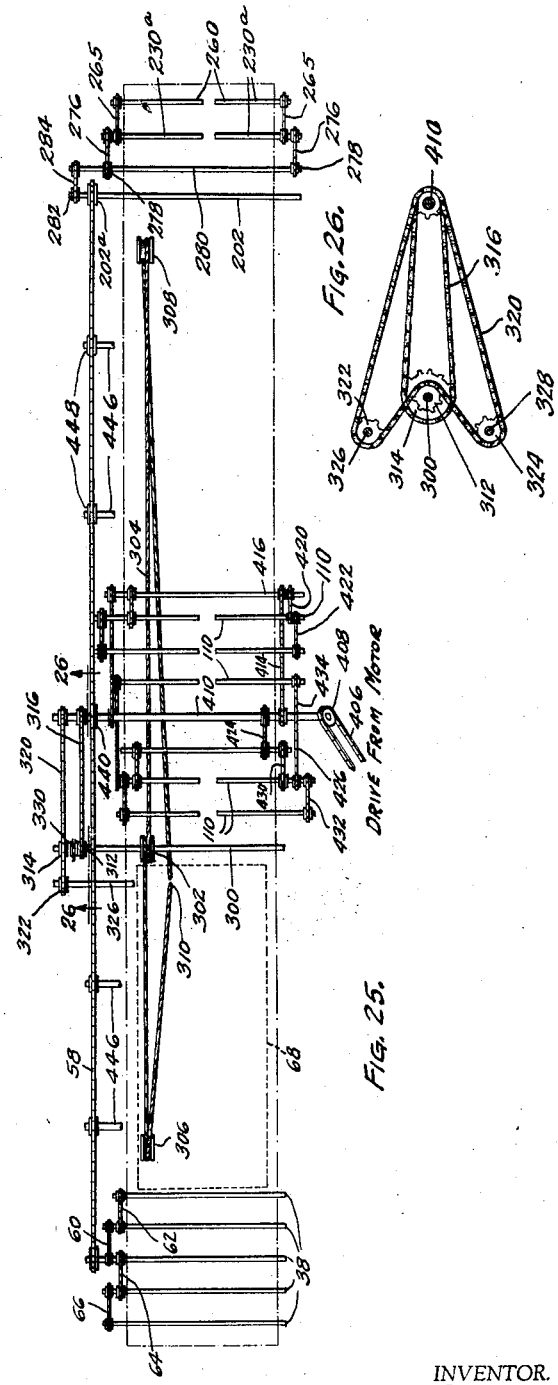
INVENTOR.
WALTER RUTTEN
BY Harry H. Hitzeman
ATTORNEY.

Patented Jan. 18, 1944

2,339,355

UNITED STATES PATENT OFFICE 2,339,355

APPARATUS FOR EDGING AND FORMING

Walter Rutten, Plainfield, Ill.

Application May 10, 1940, Serial No. 334,425

20 Claims. (Cl. 153—2)

My invention relates to an improved apparatus for cutting or edging and forming flat sheets of material such as wood, laminated wood, composition board, plywood and sheet metal blanks.

Preformed or prefabricated sheet metal units are adaptable for use in a large variety of industries. In the building of sheet metal homes or other types of buildings or portions of buildings, a large number of sheet metal units of the same size and shape are usually employed. Ordinarily these units are formed with edge portions or ribs which must be formed in the same during their fabrication. In the use of a large number of similarly shaped units for co-action in a building or other assembly, it is highly important that each individual unit together with its specific configuration, correspond exactly to the other. It is further desirable in preforming units of the type described, to perform all the bending and cutting operations necessary in a minimum of time and with a minimum of effort.

Accordingly, the principal object of the present invention is to provide an improved apparatus by which a flat sheet of material such as a sheet metal blank may be carried through a series of steps in which the periphery of the finished unit is determined and the sheet cut to the required size to meet this dimension, and ribs or other configurations either upon the edges or in the body of the unit are formed with accuracy and with a minimum of time and effort.

The further description will be directed particularly to the handling of sheet metal blanks, although it will be understood that flat sheets of other material may be similarly fabricated.

A further object of the invention is to provide an improved apparatus of the type described wherein, a continuous operation and in a continuous machine, loose blanks of sheet metal may have their edges trimmed to a desired size and continue on through the machine and receive the required bends along the edges or in the body of the sheet, be curved or otherwise formed in a lateral direction, all in a continuous operation and with one handling of the sheet.

A further object of the invention is to provide an improved machine of the type described adapted to have removable or changeable elements so that the same machine is capable of edging or forming sheet metal units of any desired size or shape within reasonable limits.

A further object of the present invention is to provide an improved apparatus of the class described so constructed that the forming heads or cutter members for edging a sheet metal unit are removable and replaceable with a minimum of effort.

A further object of the invention is to provide an improved apparatus for forming or edging a sheet metal unit wherein movable edging or cuttings heads are accurately guided throughout their operation so that every unit will be exactly the same as the next.

A further object of the invention is to provide in apparatus of the class described an improved manner of replacing or changing the forming heads so that the machine may easily and quickly be prepared to edge and form different sized units.

A further object of the invention is to provide an improved drive construction for the removable edging and forming heads.

A further object of the invention is to provide improved means associated with a machine of the type described whereby the sheet metal units which have been edged and formed may be given a final arcuate bend to a desired radius.

Another object of the invention is to provide improved mechanism for forming a radius in sheet metal members.

A further object of the invention is to provide improved drive mechanism in an apparatus of the class described whereby a work carrying table may be driven forward at a desired rate of speed throughout various operations of the machine, and then automatically reversed to return the work supporting carriage to a starting position.

A further object of the present invention is to provide removable or adjustable cam track members for guiding the edging and forming heads so that the same may be easily removed and replaced for producing sheet metal units of a different shape and contour.

A further object of the invention is to provide an improved construction of forming or edging head for a machine of the type described.

Other objects and advantages will be more apparent from the following description wherein reference is had to the fifteen sheets of drawings which accompany the same, and upon which like reference characters refer to like parts throughout the specification.

In the drawings, Fig. 1 is a front perspective view of a sheet metal blank which is to be trimmed to a desired size and then preformed with certain ribs and edge bends, after which the same is adapted to be bent to a desired radius, so that a plurality of the same connected together at their edges may form a semi-spherical roof element;

Fig. 2 is a similar perspective view illustrating the first step in the process, which is the middle rib that is formed longitudinally through the sheet;

Fig. 3 is a perspective view illustrating the third step in the process, which is the trimming of the edges so that the unit will be of a desired size;

Fig. 4 is a similar perspective view of the unit shown with the middle longitudinal rib and with the edge bends which have been formed in the same;

Fig. 5 is a perspective view of the completed unit showing the same bend to a radius so that a plurality of units, when connected together, will form a semi-spherical enclosure;

Figure 13:
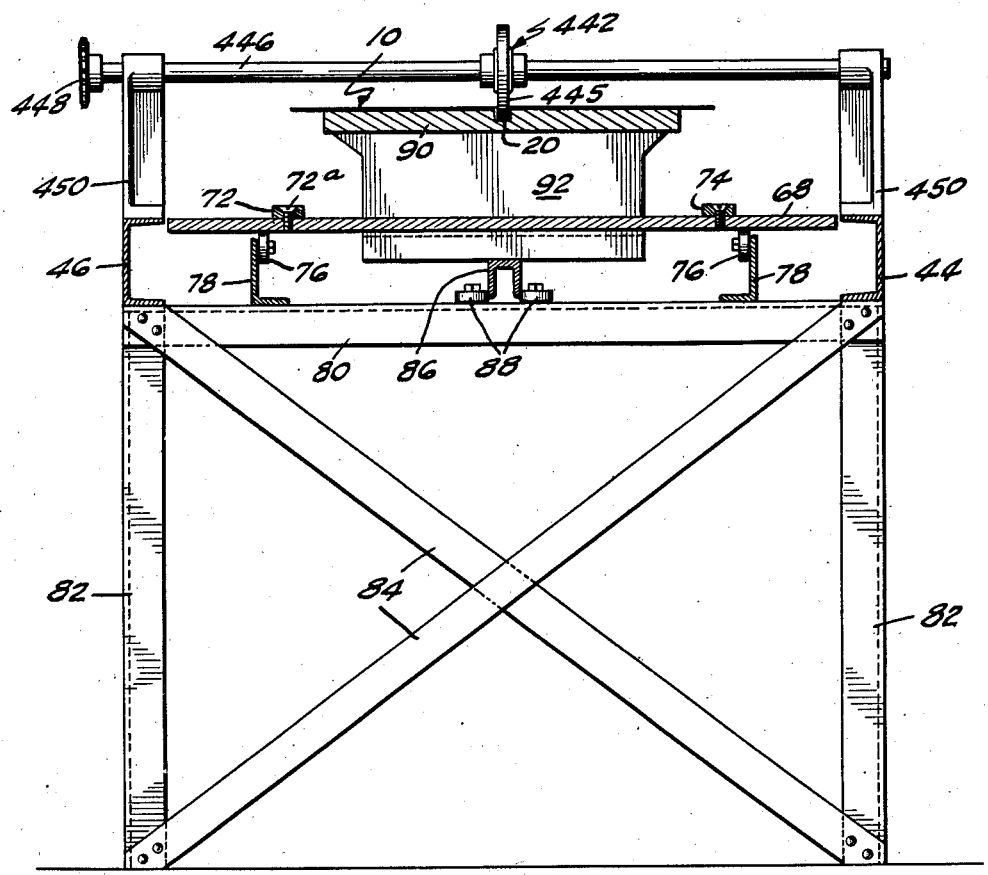
Figure 14:
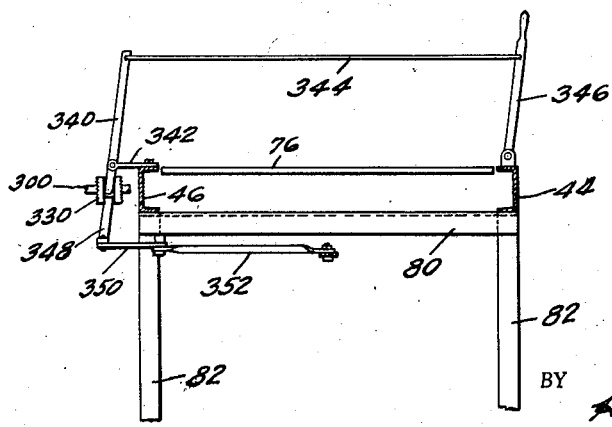
Figure 20:
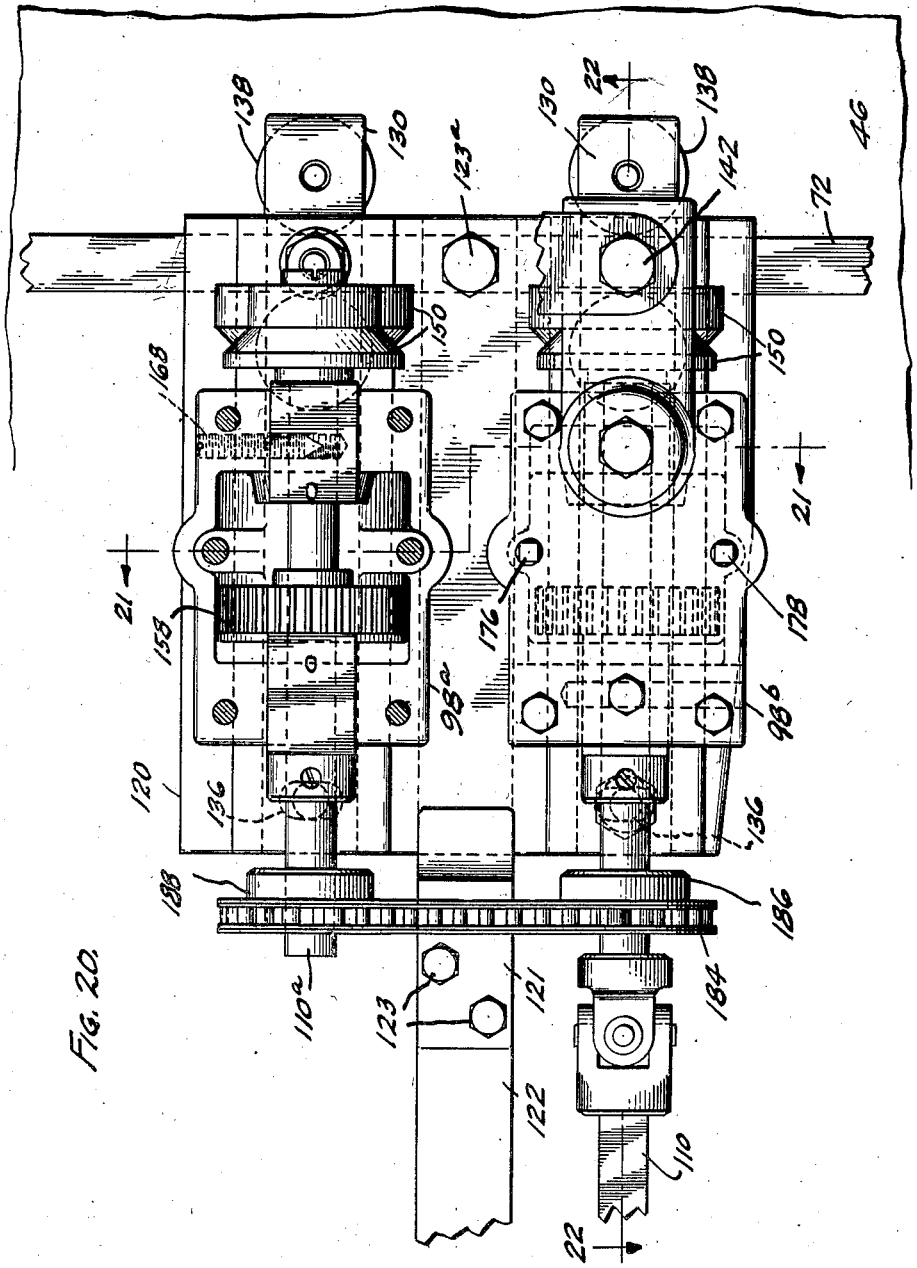

Fig. 6—A is a fragmentary plan section of the front end of the machine and starting platform, with parts broken away in the platform to foreshorten the same;

Fig. 6—B is a plan section of a portion of the machine directly forward of that shown in Fig. 6—A;

Fig. 6—C is a plan section of the portion of the machine directly forward of that shown in Fig. 6—B, and shows among other things, the edge cutting heads and several rib forming heads;

Fig. 6—D is a plan view of the rear end of the machine directly beyond that shown in Fig. 6—C, and shows among other things, the mechanism for forming the unit to a desired radius;

Fig. 7 is a fragmentary plan view of a portion of the supporting table and cam track;

Fig. 8 is a diagrammatic view showing the manner in which the movable table and work supporting carriage are removably secured together so that the work supporting table is interchangeable;

Fig. 9 is a plan view of a modified form of work table which may be substituted for that shown in Fig. 8, together with the cam track for guiding the forming dies or rollers to conform to the contour of the unit on the work table;

Fig. 10 is an enlarged fragmentary sectional view through the first set of rollers for forming the medial rib in the unit, and is taken generally on the line 10—10 of Fig. 6—A;

Fig. 11 is a fragmentary side elevational view of the same with a fragment of a sheet metal blank positioned therein;

Fig. 12 is a similar fragmentary view showing the last set of forming rollers adjacent the front of the machine for completing the rib in the sheet metal blank;

Fig. 13 is a vertical sectional view taken generally on the lines 13—13 of Fig. 6—B, illustrating the bed of the machine, the movable table and other elements;

Fig. 14 is a similar sectional view shown somewhat diagrammatically, taken generally on the line 14—14 of Fig. 6—C, showing the hand clutch operating mechanism;

Fig. 15 is a fragmentary side elevational view showing the edging and forming head station and the drive therefor;

Fig. 16 is a generally diagrammatic plan view of the carriage stop and clutch mechanism for reversing the direction of travel of the carriage;

Fig. 17 is a side elevational view of the radius forming mechanism and the receiving platform for the completed units;

Fig. 18 is a fragmentary plan view of the nose of the movable carriage;

Fig. 19 is a fragmentary side elevational view of the same with parts broken in section to more clearly show other parts;

Fig. 20 is a fragmentary plan view of a set of forming heads, with parts broken in section and broken away to more clearly show other parts;

Fig. 21 is a vertical sectional view of the same taken generally on the line 21—21 of Fig. 20;

Fig. 22 is a side sectional view of the forming heads shown in Fig. 20, taken generally on the line 22—22 of Fig. 20;

Fig. 23 is a vertical sectional view through the radius forming station and is taken generally on the lines 23—23 of Fig. 6—D;

Fig. 23—A is a cross sectional view similar to Fig. 23 taken at a different plane;

Fig. 23—B is an elevational view of the head shown in Fig. 23—A;

Fig. 24 is a diagrammatic view on a greatly reduced scale of the entire machine;

Fig. 25 is a generally diagrammatic view illustrating the drive for the various elements;

Fig. 26 is a diagrammatic sectional view taken generally on the lines 26—26 of Fig. 25; and Fig. 27 is a vertical sectional view showing one of the rotatable bearings for the square shaft drive.

The method and apparatus which I have illustrated will be described with particular reference to the method used for constructing sector shaped roof sctions for silos of the general type shown and described in Patent No. 2,112,348, issued to Peter Rutten March 29, 1938, although of course it is understood and will appear more fully hereinafter, that the machine or the method is not limited to the particular product above mentioned, and the wide and varied latitude in which the same may be used will be more apparent as the description progresses.

In forming a roof sector of the type above described and as shown in Figs. 1 to 5 of the drawings, I provide a blank 10 of sheet metal of the desired thickness or gauge suitable for the purpose required. The blank 10 may be generally shaped similar to the finished product and may have the tapered side walls 12 and 14, the reduced front end 16 and the back end 18. The first step in the method which I employ to form and trim this blank to the desired shape, is to provide a medial groove 20 in the blank 12 so that the blank may fit upon the island or saddle which is to carry it through the balance of the operations.

In Fig. 3 I have illustrated the first operation which occurs after the groove 20 has been formed. It consists of trimming the edges 12 and 14 and cutting off the portions 12a and 14a to bring the size of the blank to absolutely accurate dimensions. The next step consists in making the edge or ridge formations 22 and 24 in the edges of the blank after the same have been trimmed to the desired size. The next step consists in bending the entire blank 10 to the arcuate shape shown in Fig. 5 so that when a plurality of the same are connected together they will generally form a semi-spherical roof or enclosure unit which is adaptable to various uses such as that described in the aforementioned patent.

It will thus be seen that the method which I employ consists of the movement of a flat blank through appropriate mechanism for forming surface configurations in the same, cutting the edges to trim the blank to a desired size, bending the edges in a desired manner, and then bending the entire unit to a desired shape. In the disclosure, this is shown as arcuate, although it will be understood that the invention contemplates bending to other desirable shapes.

In Fig. 6—A I have shown a starting platform 26 upon which the sheet metal blanks may be placed with the forward edge 16 of the blank 10 against the first set of forming rollers. In order to align the same more or less accurately, I have provided a gauge pin 28 for positioning the blank, and as the same is fed forward through the first set of forming rollers, the rear edge 18 is guided in a small channel member 30 mounted upon the work table and positioned parallel with the first set of forming rollers.

As previously mentioned, the first set of forming rollers are for the purpose of forming the medial groove 20 in the blank 10. In the drawings I have shown a plurality of sets of forming rollers 32 graduated in size so that when the unit leaves the last set of rollers, a groove approximately ½" wide and ½" deep will be formed in the sheet.

The forming rollers 32 may generally comprise vertically aligned rollers 34 and 36 mounted upon shaft members 38 and 40 which extend across the machine and are positioned in suitable bearings 42. The bearings 42 may be mounted upon the top of the parallel channel members 44 and 46 which extend generally throughout the length of the machine. The bearings 42 may be of the usual type for yieldably receiving material to be worked upon, and may include the compression spring 48 positioned between the upper and lower bearing block in the parallel walled journal 50. A top plate 42a may extend the length of all five sets of forming rollers 32, and at each set of bearings I provide an adjusting bolt 52 for limiting the amount of flexibility between the rollers.

In Fig. 11 I have shown the first set of forming rollers beginning the ½" groove in the blank 12, and in Fig. 12 I have shown the last set of forming rollers 54 and 56 which provide the ½" width and ½" depth of the groove 20. Each of the shafts 38 and 40 for each of the sets of rollers 32, extends to the rear of the machine to receive a chain drive from a source of power. In order to have all of the sets of rollers rotating in the same direction, I provide the chain 58 geared to a sprocket upon the third shaft 38, and the chain drives 60, 62, 64 and 66 connected to the other shafts 38 respectively so that all of the forming rollers will revolve in the same direction.

In Fig. 6—B I have shown the section of the machine immediately forward of the first set of forming rollers which have just been described. In the initial work receiving position, the movable table 68 is positioned with its back edge 70 below the rollers 32 and the ends of the cam track members 72 and 74 abutting against the edge of the receiving table 26. The movable table 68 in the embodiment shown, is comparatively long and rests upon and is adapted for reciprocal movement upon spaced sets of 1½" rollers 76 that are mounted on angle members 78 which extend throughout the length of the machine. The angle members are supported at intervals by channel members 80 secured to the lower sides of the channel members 44 and 46. The frame as thus constructed is supported a desired height above the floor by upright channel members 82 spaced at necessary intervals and suitable cross bracing 84 throughout the machine. The table 68 is guided in its reciprocal movement by a small channel member 86 fastened to the bottom of the same and extending throughout the length of the table. The guide 86 is positioned between pairs of small rollers 88 secured upon the cross channels 80. With this construction, the table moves freely from the forward to the back end of the machine, and is guided between the frame of the machine very accurately.

The movable table 68, shown in Fig. 6—B and diagrammatically in Fig. 8, is constructed of three parts, or sections, 68a, 68b and 68c. The sections are fastened together in any suitable manner such as by screw members 68d with the intermediate section resting upon ledges 68e and 68f of the end sections. The intermediate section 68b is adapted to carry a support or saddle 90 which is generally triangular in shape and approximately the shape of the formed unit, although the shape of this support is immaterial, as will be hereinafter pointed out.

The cam track members 72 and 74 are adapted to be fastened upon the various sections of the table by suitable screw members 72a and are provided as shown in Fig. 7 with internesting portions 72b so that the intermediate portion of the table may be removed together with the cam tracks located thereon and a different section substituted. As shown in Fig. 6—B, the cam tracks 72 and 74 extend forward in general alignment with the support 90 and in the starting position of the machine, have their extended edges 94 and 96 passing through the last row of forming units shown in Fig. 6—C.

Referring now to Fig. 6—C, it will be noted that I have provided a plurality of forming head units 98 and 100 suspended from rod members 102 and 104 above the movable carriage 68. As shown in Fig. 15, the rods 102 and 104 are journalled in channel members 106 and 108 mounted upon uprights 109 which rest upon the side frame members 44 and 46. Each set of forming heads 98 may be driven by a square shaft 110 and each set of forming heads 100 may be driven by a square shaft 112. Suitable sprocket members 114 are provided on each of the shafts 110 and 112 so that by an appropriate chain drive, which will be described hereinafter, all of the forming heads are driven in the same direction and at the same rate of speed.

*The forming heads*

The forming heads 98 and 100 may be identical in construction, in their mode of operation, and in the manner in which the same are driven. Therefore in this disclosure, one set of heads will be described, it being understood that the others are similar except for the differences which will appear.

As shown in Figs. 20, 21 and 22, the forming heads 98 may include a base plate 120 which has a guide 122 pivotally connected thereto by means of a bolt member 123a at its forward end. The guide 122 (see Fig. 6—C), extends outwardly from the heads between sets of rollers 124 mounted on the table portion 126. The back edge of the base plate 120 is generally held against upward movement by an arm 121 that has a portion extending over the edge of the same and is fastened by the bolts 123 to the guide 120. Each head 98 has duplicate sets of forming rollers and drives therefor which are pivotally mounted upon the base plate 120.

Thus, as shown in Fig. 22, I provide a bolt member 128 which fastens through a roller arm 130, base plate 120, and a dovetail shaped plate 132 thereabove. The back end of the plate 132 is fastened to the plate 120 by a bolt 134 which extends through an elongated slot 136 in the plate 132 so that a complete head unit may be adjusted angularly upon the plate. The roller arm 130 carries beneath the same a pair of head guiding rollers 138 and 140 positioned upon opposite sides of the cam track member 72 that is mounted upon the movable table 46. Each of the individual roller carrying head portions 98a and 98b are pivotally connected by bolt members 142 to a cross strap 144 which in turn, is fastened to a U-shaped carrier 146 in which dual sets of rollers 148 are mounted. The support rod 102 passes between the sets of rollers 148 and in this manner both of the heads 98a and 98b are pivotally carried upon the rod 102. As thus far described, means has been provided for guiding each of the heads individually along the cam track 72 and means have been provided for supporting the same so that they are free to move in and out toward the unit or blank upon which the rollers are working.

Each of the heads carries upper and lower forming rollers 150 and 152 secured in the ends of the aligned shafts. The square shaft 110 is connected to the lower roller 150 in driving relation and the upper roller 150 may be keyed to a round stub shaft 152 mounted in the housing 154. I provide the gears 156 and 158 upon the two shafts mentioned in driving relation so that the upper shaft will be driven simultaneously with the lower. Suitable bushings and suitable journals for the shafts mentioned are provided in the housing 154. In the use of forming rollers of the type described, it is of course necessary that a yielding relation exist between the upper and the lower rollers. Accordingly, with the lower roller journalled against angular movement, I provide a bearing 160 for the shaft 152 having the coiled spring member 162 positioned thereabove and so located in the housing 154 that upward angular movement of the shaft 152 may be obtained to effect a clearance between the adjacent edges of the rollers 150. The bearing 160 may have perpendicular walls and be positioned in a vertical slot 164 in the housing 154 with a spring pressure adjusting means 166 above the spring 162 and a vertically disposed screw member 168 engaging a pointed lower end of the bearing 160 for the minute adjustment when desired. The rear end of the shaft 152 may be mounted in a bearing 170 pivoted upon a rod 172 in the housing 154 and held in position upon this pivot by a bolt member 174.

From the above description it can be seen that due to the spring member 162, the rollers will normally be held together, but when a blank of sheet material passes between the same, the upper roller is permitted against the spring tension to raise sufficiently to permit the thickness of the blank to pass between the same and be formed according to the contour of the rollers 150. Means for holding the housing 154 at its original set position upon the plate 132 may comprise the elongated bolt members 176 and 178 which have a lower threaded end 180 that passes through a tapped opening in the housing 154 and frictionally bears against the base plate 120. It is of course understood that in setting up the location of the heads for a desired forming or edging operation, it is necessary to adjust them upon the base plate 120, and it is for this purpose that the dovetail shaped plates 132 are provided, engaging in the dovetail slots 132a in the housings 154.

From the above description it will be apparent that I have provided a construction of work head which carries two sets of forming rollers, each of which is individually guided by the cam track 72 and which may be individually adjusted upon the base plate 120. With the construction shown, and with a chain drive 184 from the sprocket 186 upon shaft 110 to a sprocket 188 mounted upon the similar square shaft 110a in the head 98a, it is understood of course that the sprockets 186 and 188 are of the same size so that the speed of the work rollers 150 in each unit will be the same. While I have not shown the cutting rollers which are mounted upon the first set of heads 98 and 100, their construction is well known, and when mounted in the manner that the rollers 150 are mounted and driven in the same way, they will trim the edge of a sheet of material as hereinbefore described.

*Radius forming station*

The movable carriage 46 having moved forward through the forming rollers in Station 2 just described, wherein the edges or other grooves in the material were formed, now moves forward, automatically releases the blank that is being worked upon, and the blank or unit is introduced (see Figs. 6—D, 17 and 23) between the driven receiving rollers 200 and 202. The roller 200 has a medial enlarged flange 201 fitting into a groove 204 in the roller 202 to direct the blank, the enlargement riding in the medial groove 20 of the blank 10. The rollers 200 and 202 may be mounted in appropriate bearings in the upright support members 206 and 208 which extend from the side channel members 44 and 46. The blank 10 is directed forward and the groove 20 and its edges enter an arcuately shaped trough 210 hingedly connected at its rear end to an upright wall 212 with its forward end 214 positioned upon the upright end of vertical adjusting means such as a bolt member 216 secured to a rigid cross bar 218. A support member 220 may be connected to the cross bar 218 to provide a seat for the lower end 222 of a receiving rack 224 for the completed unit. The receiving rack 224 for the unit shown in the disclosure may consist of a plurality of frame members 226 that are arcuate in shape and provide in effect a receiving table for the completed unit. The opposite end of the table 224 may be supported by appropriate bracing 228 fastened to the side frame members 44 and 46.

Mechanism for forming a radius or other desired planetary deformation of the unit or blank may include a pair of heads such as the heads 98a positioned upon opposite sides of the trough 214. These heads may have the forming rollers 230 and 232 shaped to ride in the angularly disposed grooves that have previously been formed along the edges in the unit at Station 2. The heads 98a are mounted upon a bed plate 120a similar to that previously described with the medial pivot 124a to permit angular movement of the heads. The plate 120a may be mounted upon a channel shaped frame 236 which is positioned between the cross braces 218 and 218a. The frame 236 is provided with horizontally disposed guide rollers 238 and 240 riding against the cross braces mentioned and with supporting rollers 242 and 244 riding upon the top of the cross braces 218 and 218a, respectively. To prevent upward movement of the heads, I provide a roller 246 positioned upon a shaft 248 secured to the upper end of the head 98a and adapted to bear against one leg of a horizontal channel member 250 positioned between the uprights 208 and 206.

The roller 252, positioned in the trough 210, is mounted upon a support 254 rigidly secured to the frame member 250. This roller is adapted to generally guide the unit as it is moved forward through the radius forming rollers.

In this forward movement, the edges of the unit are guided by the rollers 230, the blank 10 is moving forward guided medially in the trough 214 and the edges of the blank are introduced between pairs of radius forming rollers 256 and 258. The rollers 256 are mounted upon brackets 259 that are secured to the heads 98a and are disposed at an angle to provide a bevel formation in the metal at the grooves to make the unit more rigid. The rollers 258 are mounted upon shafts 260 that are supported in brackets 262 pivotally mounted upon lugs 264 integral with the housing of the heads 98a. Means for moving the shafts 260 and their respective rollers up or down to form the blank into a radius of smaller or greater diameter include the rigid arms 265 connected to the pivoted brackets 262 and extending upwardly through a ledge 268 formed on the housing of the heads 98a. The arms 265 are screw-threaded at their upper ends to receive nut members 270 upon opposite sides of the ledge 268 so that by moving the nuts, the shafts 260 and their respective rollers may be moved up and down to form a greater or smaller radius in the blanks. While a similar adjustment is not shown for the rollers 256, it is of course understood that they may be interchanged or adjusted.

The shafts 260 are provided with sprocket wheels 263 to receive chain drives 265 from suitable sprockets mounted upon the shafts 230a. The shafts 230a may extend outwardly and be provided with sprockets 269 supported in suitable journals 272 mounted upon the extended table portions 274. The sprockets 269 are driven by chain members 276 from sprockets 278 mounted upon a cross shaft 280 supported in suitable bearings upon the cross frame member 250. A sprocket 282 mounted on the shaft 280 has a chain drive 284 from the driven feed roller 202 which in turn is driven by a chain 58 from the main drive shaft of the machine.

As previously described, the frame 236 of each of the heads 98a is capable of reciprocal movement across the machine, being appropriately guided by the means described. In addition, I provide a guide bar 122a for each of the heads extending outwardly between sets of rollers 124a. While the heads 98a are moved outwardly by means of the engagement of the rollers with the edge grooves as described, I employ spring means for moving them toward the center of the machine. This means may include the coiled spring members 290 connected between the heads 98a and the side uprights 206 and 208. It will be understood, however, that the cam tracks could be extended or other positive means provided for effecting the return movement of the heads.

From the foregoing description it can be seen that as a blank passes through the feed rollers 200 and 202 and is guided forward in the curved trough 214, the rigidly positioned roller 252 will hold the blank down and start forming the plane of the unit or blank into an arc in the trough 210. As the unit or blank progresses, the edges of the same meet the rollers 256 and 258 which have previously been positioned to form the desired curve in the blank. By means of rollers 230 riding in grooves in the unit, and due to the fact that the sets of rollers 256 and 258 are carried by the opposed heads 98a, the heads will move outwardly to conform to the side shapes of the unit, and will thus have a bending effect along the outer edges. With the bending taking place along the edges and directly through the middle, and with the bevels being formed as described, the unit is easily bent to conform to a desired radius.

Drive for the movable table

The table 68, as previously mentioned, is adapted to move the blank from Station 1 where the medial groove is placed in the blank, carry it through the cutting and forming rollers at Station 2, and deliver the blank to the radius forming mechanism just described at Station 3. The empty table then automatically returns to its initial starting position to receive the next blank. In its return trip the cam tracks move all of the forming and cutting heads at Station 2 back to a starting position.

The carriage is adapted to be driven (see Figs. 25 and 26) in both directions from a shaft 300 which carries a pulley 302 about which a cable 304 forms a complete circle, one end extending about a pulley 306 carried by the table 68, and the other end extended about a pulley 308 journalled in the base adjacent Station 3. Both ends of the cable are connected at 310 to the forward end of the table 68. When the shaft 300 is revolved in a counter-clockwise direction, the table 68 will be moved forward carrying the work through the various stations described, and when the shaft 300 is rotated in a clockwise direction, the table will be moved back to its original starting position.

In order to accomplish this movement, I provide a pair of sprockets 312 and 314 on the shaft 300. The sprocket 312 is driven by a chain 316 directly from the main drive shaft 410. The sprocket 314 is driven by a chain 320 which passes over a pair of idler sprockets 322 and 324 mounted upon the stub shafts 326 and 328. Both the sprockets 312 and 314 are loose upon the shaft 300. A driven clutch member 330 positioned between the same and keyed to the shaft is adapted to be automatically moved to engage with one or the other of these sprockets. Thus, when sprocket 312 is engaged and driven, the shaft 300 will be revolved in a counter-clockwise direction and the table will be moved forward through the machine in the manner described. When, however, the clutch engages the sprocket 314, due to the idler sprockets 322 and 324, the direction of rotation of the shaft 300 is reversed, and the table will be moved back through the machine to a starting position.

By making the sprocket 302 for the direct drive larger than the sprocket 314, the speed of movement of the empty table back to a starting position may be increased, thus speeding up the operation of the machine.

In Figs. 14 and 16 I have shown in a diagramatic manner the hand clutch operating mechanism and the automatic mechanism for operating the clutch to reverse the direction of travel of the table at the end of its operation. The clutch 330 mounted on shaft 300 may have a hand lever 340 for manually operating the same. The lever 340 may be pivoted from an arm 342 mounted on the frame member 46 and have a rod 344 connected thereto and extending to a hand lever 346 pivotally mounted upon the front frame member 44. The arm 340 may have an extension 348 extending downwardly and connecting with a lever 350 below the cross frame members 80. The lever 350 in turn connects with a bell crank lever 352 pivoted beneath the frame member 46 and extending inwardly to a point below the center of the table 68. The end 353 thereof is extended upwardly. A lever 352a may be pivotally mounted on frame member 46 and extend inwardly with a similar upright end 355. A link 357 connects the levers 352 and 352a so that they work in unison. A stop member 359 is mounted behind end 353 and a similar stop member 361 is mounted ahead of upright end 355.

I provide an abutment 354 (Fig. 8) adjacent the front end of the table 68, which is adapted to strike the end 355 of the lever 361 and move the same against stop member 361 when the work carriage has passed through Station 2 of the machine and the work has been released and is ready to enter Station 3. This abutment moves the bell crank lever 352 and associated levers to reverse the clutch mechanism and start the table back to its original position. Upon the return of the table to a work receiving position, the abutment 358 strikes the upturned end 353 and moves the same against stop 359 reversing the clutch and starting the table forward with another blank. In the event manual control of the machine is desired, the arm 350 is disconnected and the entire control is in handle 346.

*Drive mechanism*

In order to secure as simple a drive mechanism as possible and have all of the mechanism operate in timed relation, I use a single source of power such as an electric motor 400 which may be directly connected to a speed reducer 402. I provide a sprocket 404 on the shaft of the speed reducer to drive a chain 406 trained about the sprocket 408 on the main drive shaft 410. The shaft 410 may be mounted in suitable bearings 412 below the frame members 44 and 46 respectively.

Referring first to the drive for the five sets of heads 98 upon the front side of the machine (Figs. 15 and 25), I provide a chain drive 414 from a sprocket on the main drive shaft to a sprocket upon a cross shaft 416 mounted in suitable bearings 418 below the frame members 44 and 46. I provide a chain drive 420 from a suitable sprocket on this shaft to the square shaft 110 mounted directly thereabove. A chain 422 may extend from the first shaft 110 above mentioned to a suitable sprocket upon the next shaft 110. I also provide a chain drive 424 from the main drive shaft to a cross shaft 426 located in suitable bearings 428 below the frame members 44 and 46. From the shaft 426 I provide a chain drive 430 up to a square shaft 110 which has a chain drive 432 thereon to a suitable sprocket upon square shaft 110 on one side, and a similar chain drive 434 to a square shaft 110 upon the opposite side of the same.

With the drive as thus described for the five sets of heads 98 upon the front side of the machine, it can be seen that all of the heads will be driven in a counter-clockwise direction at the same rate of speed. The drive for the heads upon the opposite side of the machine may be identical except for the fact that no sprocket similar to 424 or to 420 is required from the shafts 426 and 416, respectively.

The drive for moving the table back and forth has already been described with particular reference to sprockets 316 and 320.

The drive for the five sets of forming rollers for making the medial groove at station No. 1, as previously explained, is by the chain 58 which extends the length of the machine, being driven by a sprocket 440 on the shaft 410. The chain 58 may also drive the holding and advancing rollers 442 (see Figs. 13 and 24) which are located at intervals and have a rubber or other resilient disc 445 that seats in the groove 20 of the blank 10 and serves both to hold the blank in place, and advance the same at the same rate of speed that the table 68 and the platform 90 are moving. Several of these units are shown throughout the length of the machine, comprising generally the disc 445 previously mentioned, the shaft 446 upon which the same is mounted, and sprocket wheels 448 keyed to the shafts. Suitable bearings 450 are provided for the shaft 446 positioned upon the frame members 44 and 46. The shaft 202, from which the drive for station No. 3 is obtained, also carries a sprocket 202a driven by the chain 58.

By reason of the fact that all of the necessary moving parts of the machine are driven from a main drive shaft with a chain drive over sprockets, the sprockets being of a determined size, it will of course be obvious that exact timing and synchronism in the operation of the various parts can easily be obtained. This is important in a machine of this character, both from the standpoint of smooth and steady operation as well as from the standpoint of efficient and accurate performance.

In Fig. 27 I have shown a fragmentary sectional view of one of the pivoted bearings 13 which are mounted upon the table 126. These bearings may generally be formed with a disc-shaped base portion 13a adapted to seat in a complementary opening 13b in the top of table 126 and be held in position by suitable means such as a bolt member 13c. Thus, when the angle of shaft 110 is changed, due to a change in the position of the heads 98, the bearing will swivel on its base and provide an aligned bearing for the shaft. In the event of extreme bends in the cam tracks 72 and 74, a flexible shaft may be connected to the shafts 110.

In Fig. 9 I have shown a modified form of the middle section 68b of the table 68. In this construction I have shown a work support bench 90a without a medial groove for supporting work. Rather, what I prefer to employ is a plurality of magnetic chucks 90b mounted in the surface of the same so that sheet metal or other magnetic material can be securely held in position by the above means. In this construction I have shown the cam tracks 73 and 75 shaped to form the edges of a sheet to the general contour outlined by the tracks.

From the showing of the above modification, it will be obvious that within limits, any reasonable curvature of cam track may be provided, the track being constructed of segments interconnected, such as the segments 72 and 71 in Fig. 7.

The platform 90, shown in Fig. 6—B, may have a nose 501 (see Figs. 18 and 19) generally formed to receive the end of the unit 10 with the middle groove 20 resting in a trough portion 503 with the forward end of the unit beneath a locking bolt 505. As the support moves forward in this position, the forward end of the unit is rigidly held in place to be introduced through the various work stations. When the support 90 has passed through station 2 and has arrived at the feed rollers 200 and 202 of station 3, the stop member 507 mounted on a cross member 509 at station 3, strikes against a pivoted lever 511. The lever 511 is mounted upon the pivot pin 513 and is pivotally connected by a pin 515 to a block 517 which carries the locking pin 505. Forward movement of the carriage will move the lever 511 and compress the spring 519, moving the locking pin 515 and permitting the removal of the unit 10.

Summary of operation

It has been pointed out in the objects of the invention that process and the apparatus illustrating the same would show a means for moving a flat sheet of material through various stations to perform various operations upon the same and deliver the completed units at the end of the machine. Accordingly, a blank of material such as the sheet metal blank 10 shown in Fig. 1, is placed upon the starting table 26 shown in Fig. 6—A, with its front end 16 against the first set of the forming rollers 32. The sheet is fed through the rollers to form the ½-inch medial groove 20 in the same and is delivered to the platform 90 which has a slot within which the medial groove 20 is positioned with the sheet flat upon the platform 90. The hold-down rollers 442 assist in keeping the sheet in position as well as in moving the same forward upon the platform.

It will be noted that the end 501 of the movable platform 90 in the starting position is positioned between the first sets of forming heads 98 and 100. The forward ends of the cam tracks 72 and 74 are of course extended through the battery of forming heads 98 and 100 so that as the table 68 and the platform 90 are moved forward, the forming rollers will be spread by the cam track and will cut and form the edges of the unit to the desired shape, according to the location of the cam tracks. After the movable platform has moved through the battery of cutting and forming heads at station 2, the end or nose of the same strikes a release 507 adjacent the said rollers 200 and 202 in station 3. The blank or unit is thus released at station No. 3, and fed between the feed rollers 200 and 202 by the advancing rollers 442. The sheet or blank is then moved forward between feed rolls 200 and 202 with the groove 20 positioned in the trough 210. The rollers 236, which ride in the grooves formed in the edges of the unit, are located on similar heads 98a and 98b that move outwardly as the unit passes through.

A pair of bevel forming rollers 256 and 258 form the bevel at the edge of the unit and are so positioned that the unit is curved or bent in the plane of the same to a desired arc. After the unit leaves the trough 214 and the radius forming rollers 256 and 258, it drops into the receiving station 220 from which it may be lifted by hand and leave the station ready to receive the next unit coming through the machine. As previously explained in connection with the drive mechanism, when the table carrying the platform 90 reaches station 3, the movement of the same is reversed and the table travels back at a greater speed to receive the next unit or blank that is coming through the forming heads at station No. 1.

From the above description it will be apparent to those skilled in the art that I have provided a comparatively simple continuous process of edging or cutting and forming flat sheet material into desired size, shape and surface configuration. It will further be obvious that while in the description a specific unit has been described, with particular reference to the formations made in the same, the apparatus and the process are clearly not limited to the unit shown, and by changing the locations or shapes of the forming heads and radius forming mechanism, any conceivable shape or size of the unit, within reasonable limits, may be fabricated. I contemplate that changes and modifications may be made in the exact details shown or in the procedure of the operations described, and I do not wish to be limited in any particular; rather what I desire to secure and protect by Letters Patent of the United States is:

1. A straight line machine for fabricating sheet metal units including a starting table having guide means for a sheet metal blank thereon, a set of forming rollers adjacent said table for making grooves in said blank, a movable table, a support on said table for a sheet metal blank, a pair of cam tracks on said table, a set of edge cutting and forming rollers in advance of said table, means for moving said table forward, said cam tracks adapted to guide said rollers during their operation and means in advance of said rollers for bending said unit to a desired shape.

2. Apparatus of the class described comprising an aligned receiving table and three operating stations, a movable platform adapted to receive work and carry the same forward through the machine in a straight line, said first station having means for forming ridges and grooves in a blank of sheet metal, said second station having movable forming heads adapted to form the edge of the blank to a desired configuration according to the shape of the blank carrying platform, and means in said third station for forming a completed unit into an arcuate sector.

3. Apparatus of the class described comprising an aligned receiving table and a pair of operating stations, a movable platform adapted to receive work and carry the same forward through the machine in a straight line, said first station having means for forming ridges and grooves in a blank of sheet metal and said second station having movable forming heads adapted to form the edge of the blank to a desired configuration according to the shape of the blank carrying platform.

4. Apparatus of the class described comprising an aligned receiving table and three operating stations, a movable platform adapted to receive work and carry the same forward through the machine in a straight line, cam tracks on said platform, said first station having means for forming ridges and grooves in a blank of sheet metal, said second station having movable forming heads adapted to form the edge of the blank to a desired configuration, said heads directed by said cam tracks, and means in said third station for forming a completed unit into an arcuate sector.

5. Apparatus of the class described comprising an aligned receiving table and three operating stations, a movable platform adapted to receive work and carry the same forward through the machine in a straight line, automatic forming head directing means on said platform, said first station having means for forming ridges and grooves in a blank of sheet metal, said second station having movable forming heads adapted to form the edge of the blank to a desired configuration, said heads directed by said automatic forming head directing means, and means in said third station for forming a completed unit into an arcuate sector.

6. A forming head of the class described comprising a housing, a pair of vertically aligned shaft members therein, forming rollers mounted on said shafts, a base plate below said housing, a dovetail joint between said housing and said base plate, rollers mounted below said base plate for engaging directing means therefor, and means for rotating said forming rollers while they are being oscillated back and forth.

7. A forming head of the class described comprising a housing, a pair of vertically aligned shaft members therein, drive means between the same, forming rollers mounted on said shafts, a base plate below said housing, means for adjustably securing said housing on said base plate, rollers mounted below said base plate for engaging directing means therefor, and means for rotating said forming rollers while they are being oscillated back and forth.

8. A forming head of the class described comprising a housing, a pair of vertically aligned shaft members therein, drive means between the same, cutting rollers mounted on said shafts, a base plate below said housing, means for adjustably securing said housing on said base plate, rollers mounted below said base plate for engaging directing means therefor, and means for rotating said cutting rollers while they are being oscillated back and forth.

9. A forming head of the class described comprising a housing, a carriage above said housing supporting the same, a pair of vertically aligned shaft members in said housing, forming rollers mounted on said shafts, a base plate below said housing, a dovetail joint between said housing and said base plate, means for moving said base plate back and forth, rollers mounted below said base plate for engaging said moving means, and means for rotating said forming rollers while they are being oscillated back and forth.

10. The combination with a machine for cutting and shaping a sheet of flat material to a desired size and surface configuration of mechanism for forming the sheet of flat material into a curved plane, comprising feed rollers, a curved trough in front of said feed rollers adapted to guide a sheet of material, a roller holding said sheet in said trough, a pair of forming heads upon opposite sides of said sheet, a pair of forming rollers on each head disposed in the plane of the end of said trough whereby material passing through will be formed to a radius.

11. A forming head assembly of the class described comprising a base plate, means associated therewith for guiding said base plate in back and forth motion, said means including a guide bar for directing the motion in a straight line and a cam track positioned beneath said base plate for directing the back and forth motion a pair of housings pivotally mounted on said base plate, forming rollers on the same, a drive for one set of rollers, a sprocket connecting the sets of rollers together, and means associated with each set of rollers for permitting movement of said heads back and forth without disturbing the forming roller drive.

12. A dual forming head assembly of the class described comprising a flat base plate, means associated therewith for guiding said base plate in back and forth motion, said means including a guide bar for directing the motion in a straight line and other means positioned beneath said base plate, and cooperating therewith for directing the back and forth motion, a pair of housings pivotally mounted on said base plate, forming rollers on the same, a drive for one set of rollers, a sprocket connecting the sets of rollers together, and means associated with each set of rollers for permitting movement of said heads back and forth without disturbing the forming roller drive.

13. A dual forming head of the class described comprising a base plate, means associated therewith for guiding said base plate in back and forth motion, said means including a guide bar and a cam track positioned beneath said base plate, rollers below said base plate engaging said cam track, a pair of housings pivotally mounted on said base plate, forming rollers on the same, a drive for one set of rollers, a sprocket connecting the sets of rollers together, and means associated with each set of rollers for permitting movement of said heads back and forth without disturbing the forming roller drive.

14. A dual forming head of the class described comprising a base plate, means associated therewith for guiding said base plate in back and forth motion, said means including a set of guide rollers for said bar and said cam track, a guide bar and a cam track positioned beneath said base plate, a pair of housings pivotally mounted on said base plate, forming rollers on the same, a drive for said rollers, and means associated with said rollers for permitting movement of said heads back and forth without disturbing their drive.

15. A dual forming head of the class described comprising a base plate, means associated therewith for guiding said base plate in back and forth motion, said means including a guide bar and a cam track positioned beneath said base plate, stationary rollers for directing said guide bar and rollers beneath said base plate for cooperating with said cam track, a pair of housings pivotally mounted on said base plate, forming rollers on the same, a drive for one set of rollers, a sprocket connecting the sets of rollers together, and means associated with each set of rollers for permitting movement of said heads back and forth without disturbing the drive for said rollers.

16. Apparatus for forming a sheet of flat material into a curved plane, comprising feed rollers a curved trough in front of said feed rollers adapted to guide a sheet of material, a roller holding said sheet in said trough, a pair of forming heads upon opposite sides of said trough, a pair of forming rollers, thereon disposed in the plane of the end of said trough whereby material passing through will be formed to a desired radius.

17. Apparatus for forming a sheet of flat material into a curved plane, comprising feed rollers, a curved trough in front of said feed rollers adapted to guide the forward end of a sheet of material, a roller holding said sheet in said trough, a pair of forming heads upon opposite sides of said sheet, a pair of forming rollers thereon disposed in the plane of the end of said trough whereby material passing through will be formed to a radius at a medial line thru the same and along its edges.

18. Apparatus for forming a sheet of flat material into a curved plane, comprising feed rollers a curved trough in front of said feed rollers adapted to guide the forward end of a sheet of material, a roller holding said sheet in said trough, a pair of forming heads upon opposite sides of said sheet, a pair of forming rollers thereon disposed in the plane of the end of said trough whereby material passing through will be formed to a radius at a medial line thru the same and along its edges, said forming heads capable of back and forth motion to follow the side edges of the sheet.

19. Apparatus for forming a sheet of flat material into a curved plane, comprising feed rollers, a curved trough in front of said feed rollers adapted to guide the forward end of a sheet of material, a roller rigidly positioned above said trough for holding said sheet in said trough, a pair of forming heads upon opposite sides of said sheet, said heads having pairs of forming rollers one set adapted to ride in grooves adjacent the side edges of the sheet and one set disposed in the plane of the end of said trough whereby material passing through will be formed to a desired radius.

20. Apparatus for forming a sheet of flat material into a curved plane, comprising feed rollers, a curved trough in front of said feed rollers adapted to guide the forward end of a sheet of material, a roller rigidly positioned above said trough for holding said sheet in said trough, a pair of forming heads upon opposite sides of said sheet, said heads having pairs of forming rollers one set adapted to ride in grooves adjacent the side edges of the sheet and one set disposed in the plane of the end of said trough whereby material passing through will be formed to a desired radius, said forming heads having guide means for directing the same in a back and forth motion and drive means for said sets of rollers.

WALTER RUTTEN.